US012523597B2

(12) United States Patent
Reynolds

(10) Patent No.: US 12,523,597 B2
(45) Date of Patent: Jan. 13, 2026

(54) OPTICAL MEASUREMENT APPARATUS AND METHOD OF RAPID MEASUREMENT

(71) Applicant: Occuity Limited, London (GB)

(72) Inventor: James Reynolds, Gloucestershire (GB)

(73) Assignee: Occuity Limited, London (GB)

( * ) Notice: Subject to any disclaimer, the term of this patent is extended or adjusted under 35 U.S.C. 154(b) by 119 days.

(21) Appl. No.: 18/563,783

(22) PCT Filed: May 16, 2022

(86) PCT No.: PCT/EP2022/063181
§ 371 (c)(1),
(2) Date: Nov. 22, 2023

(87) PCT Pub. No.: WO2022/248271
PCT Pub. Date: Dec. 1, 2022

(65) Prior Publication Data
US 2024/0241041 A1 Jul. 18, 2024

(30) Foreign Application Priority Data
May 26, 2021 (GB) .................................... 2107469

(51) Int. Cl.
*G01N 21/31* (2006.01)
*G01B 11/06* (2006.01)
(52) U.S. Cl.
CPC ............. *G01N 21/31* (2013.01); *G01B 11/06* (2013.01)
(58) Field of Classification Search
CPC ........ G01N 21/31; G01N 21/45; G01B 11/06; G01B 9/02042; G01B 9/0209;
(Continued)

(56) References Cited

U.S. PATENT DOCUMENTS 11,480,518 B2 * 10/2022 Prater .................. G02B 21/002
2013/0100406 A1 * 4/2013 Buckland ........... G01B 9/02091
356/51

OTHER PUBLICATIONS

International Search Report and Written Opinion for PCT Application No. PCT/EP2022/063181 dated Aug. 11, 2022.

* cited by examiner

*Primary Examiner* — Md M Rahman
(74) *Attorney, Agent, or Firm* — Bracewell LLP; Keith R. Derrington

(57) ABSTRACT

An optical measurement apparatus (100) combining confocal measurement and low-coherence interferometric measurement comprising: a Fourier domain interferometric measurement subsystem (104) comprising a spectrometer (110) operably coupled to a reference arm (136), a measurement arm (138) and a source of electromagnetic radiation (106) via an optical coupler (108), the spectrometer (110) comprising a spectral signal generator (146) responsive to received reflected electromagnetic radiation. A confocal measurement subsystem (102) is also provided comprising an optical scanner (120) having a predetermined scan range for longitudinally scanning, when in use, a beam along a region (128) to be measured. A processing resource (142, 144) is operably coupled to the Fourier domain interferometric measurement subsystem (104) and the confocal measurement subsystem (102) and the confocal measurement subsystem (102) shares the measurement arm (138) with the Fourier domain interferometric measurement subsystem (104), the shared measurement arm (138) comprising the optical scanner (120) of the confocal measurement subsystem (102). The reference arm (136) comprises a reference optical reflector element (130, 132, 134), and the processing resource (142, 144) is configured to provide an accumulator (Continued)

(148) operably coupled to the spectral signal generator (146).

11 Claims, 4 Drawing Sheets

(58) Field of Classification Search
CPC .... G01B 11/0675; G01B 9/0203; G01B 9/02; G01B 9/02009; G01B 9/02015
USPC .......................................................... 356/326
See application file for complete search history.

OPTICAL MEASUREMENT APPARATUS AND METHOD OF RAPID MEASUREMENT

FIELD

The present invention relates to an optical measurement apparatus of the type that, for example, measures thickness and refractive index of a region to be measured located. The present invention also relates to a method of rapidly measuring, the method being of the type that, for example, measures a thickness and refractive index of a region to be measured located.

BACKGROUND

In the field of optical metrology, it is desirable to measure a thickness of a region of a material under investigation, for example biological tissue. It is further desirable, for some applications, to make measurements using a hand-held device. A number of measurement techniques exists to enable measurement of the thickness of a sample, for example techniques employing low-coherence interferometry or confocal optics. Both confocal optics and low coherence interferometry can be employed separately to measure thickness, for example as described in UK patent no. 2 451 442, and as is described in "Optical fibre Fizeau-based OCT" (Casaubieilh et al., Proceedings of SPIE: Second European Workshop on Optical Fibre Sensors: 9-11 Jun. 2004, Santander, Spain, pages 338 to 341), respectively.

Both techniques are capable of measuring either thickness or refractive index. However, in order to measure one of thickness or refractive index using one of these techniques, knowledge of the other parameter is required. For example, in order to be able to measure thickness, an estimate of the refractive index of the material is required. Furthermore, each of the above techniques uses a different measure of refractive index: low-coherence interferometry measurements are in the context of a group refractive index, whereas confocal optics measurements are in the context of a so-called phase refractive index. A disconnect therefore existing between these measures of refractive index.

Nevertheless, for some applications, it is desirable to measure both thickness and refractive index independently as both parameters provide useful diagnostic information.

In this regard, it is known to combine confocal imaging systems with interferometric imaging systems, particularly Optical Coherence Tomography (OCT) systems, for example as described in: "Combined reflectance confocal microscopy-optical coherence tomography for delineation of basal cell carcinoma margins: an ex vivo study" (Iftimia et al., Journal of Biomedical Optics, January 2016, Vol. 21(1), pages 016006-1 to 016006-7), "Combined reflection confocal microscopy and optical tomography imaging of esophageal biopsy" (Kang et al., Gastrointestinal Endoscopy, Volume 69, Issue 5, 2009, AB368), and "Optical coherence tomography combined with confocal microscopy for investigation of interfaces in class V cavities" (Rominu et al., Proceedings of SPIE-OSA Biomedical Optics, SPIE Vol. 7372, pages 737228-1 to 737228-6).

However, the arrangements described in these documents employ confocal optics for lateral imaging and low-coherence interferometry (OCT) for longitudinal imaging rather than measuring thickness and refractive index. In this regard, the authors of these documents do not seek to measure both thickness and refractive index and so are not concerned with addressing measurement of both in the light of the thickness is measured indirectly from an estimate of refractive index and moreover the fact that each technique relies upon a different measure of refractive index.

In contrast, "Characterizing refractive index and thickness of biological tissues using combined multiphoton microscopy and optical coherence tomography" (Zhou et al., Biomed Optical Express, 1 Jan. 2013, Vol. 4, No. 1, pages 38 to 50) describes characterisation of a refractive index and thickness distribution in biological tissue by combining multiphoton microscopy (MPM) and optical coherence tomography (OCT) systems. However, arrangements of this type are typically quite complex and do not lend themselves well for use in portable devices owing to the need to use a femtosecond laser. This technique also requires the presence of fluorophores for twin-photon excitation and/or non-spherosymmetric molecules for second harmonic generation, thereby limiting the range of target materials with which this technique can be employed. Additionally, output signals from each of these techniques are small and so require the use of photomultiplier tubes. Furthermore, in relation to certain in vivo applications, for example an eye, use of a femtosecond laser may not be safe owing to the need to generate a very high peak power to obtain a measurable signal using either of the above techniques.

Korean patent publication KR20090078296 also relates to measurement of refractive index and thickness by combining low-coherence interferometry and confocal optics. However, in order to address the disconnect between the phase refractive index and the group refractive index mentioned above, the techniques described in this publication calculate a measure of dispersion linking the phase refractive index with the group refractive index. The apparatus described therein employs a confocal optical system and an adjustment mechanism to adjust an optical path length between a beamsplitter and a sample under investigation in order to maximise an incoherent confocal signal prior to making an interferometric measurement. Measurements are made at multiple wavelengths in order to determine the dispersion, which is used to determine phase and group refractive indices, thereby enabling the thickness to be calculated. This adds complexity to the process of making combined confocal and low-coherence interferometric measurements. Furthermore, although this document refers to "simultaneous" measurements being made, it is not in the temporal sense and refers to a single optical system capable of making all the measurements required over time in order to determine the thickness and refractive indices. As such, the apparatus described in KR 20090078296 is unable to measure substantially contemporaneously a sample in a single measurement step in order to determine the thickness and refractive index of the sample.

For some applications, size of apparatus and measurement speed are a consideration, for example where a region under test can be subject to movement, such as measurements made in respect of an eye, and in this regard the use of Fourier domain low-coherence interferometry provides these benefits. However, unlike the time-domain equivalent, Fourier domain low-coherence interferometry has a operational limitations in terms of measurement range and resolution.

Whilst using the same broadband light source, in contrast with time domain low-coherence interferometry, Fourier domain low-coherence interferometry (FD-OCT) employs a fixed reference mirror and a spectrometer to detect a signal. The spectral signal generated by the spectrometer is Inverse Fast Fourier Transformed to obtain an optical path difference between light reflected from the fixed reference mirror and light reflected from a sample object. Where the spectrometer employs an array detector of N pixels, the spectrometer can only resolve N/2 spots over a measurement range of the Fourier domain low-coherence interferometer. For example, for an array of 2000 pixels and where a resolution of 1 μm is required, the scan range can only be 1 mm. This range limit can also result in an ambiguity in distinguishing between a sample object with a range shorter than the optical distance of the reference mirror and one with a range longer than the optical distance of the sample mirror.

It is known to resolve this ambiguity by phase-shifting a signal in the reference arm of the interferometer or by using multiple mirrors in the reference channel, for example as described in International patent publication no. 2016/068707 and US patent publication no. 2014/160430. Whilst such an approach increases the number of resolvable spots to N, this number is still smaller than is achievable using the time-domain equivalent system, where the range and resolution are independent of one another.

As mentioned above, an optical system for low-coherence interferometry generally requires a focal depth of the order of a required measurement range. This requirement is very different from the requirement of a confocal measurement system, which requires a short focal depth, the focus being scanned over the required measurement range: a long focal depth implies a very low numerical aperture, which means that the returned signal is very sensitive to angle for specularly reflected light, and very low in amplitude for scattered light.

Whilst combination of confocal and interferometric measurement systems is known for some applications, for example for generating images as described in International patent publication no. 2008/052311, Chinese patent publication no. 104684457 and Japanese patent publication no. 2014115161, such combinations have hitherto been unsuitable for applications requiring both confocal and interferometric measurements in respect of reflections and a relatively long measurement range. For such applications, the two systems are typically operated in parallel, for example as described in US patent publications nos. 2006/158655 and 2011/261367.

SUMMARY

According to the present invention, there is provided an optical measurement apparatus combining confocal measurement and low-coherence interferometric measurement, the apparatus comprising: a Fourier domain interferometric measurement subsystem comprising a spectrometer operably coupled to a reference arm, a measurement arm and a source of electromagnetic radiation via an optical coupler, the spectrometer comprising a spectral signal generator responsive, when in use, to received reflected electromagnetic radiation; a confocal measurement subsystem comprising an optical scanner having a predetermined scan range for longitudinally scanning, when in use, a beam along a region to be measured; and a processing resource operably coupled to the Fourier domain interferometric measurement subsystem and the confocal measurement subsystem; wherein the confocal measurement subsystem shares the measurement arm with the Fourier domain interferometric measurement subsystem, the shared measurement arm comprising the optical scanner of the confocal measurement subsystem; the reference arm comprises a reference optical reflector element; and an accumulator operably coupled to the spectral signal generator.

The reference optical reflector element may be a reference mirror or a reference retroreflector, for example an optical fibre retroreflector.

The optical scanner may be configured to perform a longitudinal scan; the spectrometer may be configured to generate a time-varying spectral signal during the longitudinal scan; and the accumulator may be configured to receive the time-varying spectral signal and to generate an accumulated spectral signal in respect of the longitudinal scan.

The apparatus may further comprise: a plurality of reference optical reflector elements comprising the reference optical reflector element; and a reflector element selection unit operably coupled to the plurality of reference optical reflector elements; wherein the reflector element selection unit may comprise an optical switch; the optical switch may be configured to select the reference optical reflector element of the plurality of reference optical reflector elements in response to a control signal.

The plurality of reference optical reflector elements may be a plurality of reference mirrors or a plurality of reference retroreflectors.

The mirror selection unit may be operably coupled to the processing resource; the processing resource may be configured to generate the control signal in response to a positional state of the optical scanner.

The plurality of reference optical reflector elements may respectively provide different optical path lengths in respect of the reference arm.

The positional state of the optical scanner may be a position. The positional state of the optical scanner may be a time within a duration of a translation time of the optical scanner.

The apparatus may further comprise: a position encoder unit operably coupled to the processing resource and configured to provide position information in respect of the optical scanner.

The translatable optical element may be a lens. The translatable optical element may be constrained to linear translation.

The source of electromagnetic radiation may be a source of at least partially coherent electromagnetic radiation.

The source of at least partially coherent electromagnetic radiation may be a common source of electromagnetic radiation operably shared by the confocal measurement subsystem and the Fourier domain interferometric measurement subsystem.

The source of electromagnetic radiation may be configured to emit a common wavelength of electromagnetic radiation and may be shared by the confocal measurement subsystem and the Fourier domain interferometric subsystem.

The confocal measurement subsystem may comprise a confocal detector.

Alternatively, the spectrometer may be configured to provide confocal detection.

The confocal measurement subsystem and the Fourier domain interferometric measurement subsystem may be configured to provide, when in use, to the confocal detector a proportion of first electromagnetic radiation reflected in respect of the measurement arm before combination with second electromagnetic radiation reflected, when in use, in respect of the reference arm.

The first and second electromagnetic radiation may originate from the source of electromagnetic radiation. The first and second electromagnetic radiation may be of a common wavelength.

The apparatus may further comprise: another optical coupler operably coupled to the optical coupler, the confocal detector and the optical scanner.

The processing resource may be operably coupled to the confocal detector; and the processing resource may be configured to perform, when in use, a confocal measurement and an interferometric measurement substantially contemporaneously over a measurement cycle.

The Fourier domain interferometric measurement subsystem may be operationally dependent upon the confocal measurement subsystem.

The processing resource may be configured to solve a system of equations using the confocal measurement and the interferometric measurement by neglecting a dispersion of electromagnetic radiation or assuming a constant dependent upon the dispersion of the electromagnetic radiation.

The dispersion may be assumed similar to a dispersion of water.

The solution of the system of equations may provide a measure of refractive index and thickness of the region to be measured. The measure of refractive index and thickness of the region to be measured may be determined without further measurement.

The Fourier domain interferometric measurement subsystem may be a low coherence interferometric measurement subsystem.

The apparatus may further comprise a lookup table comprising a plurality of confocal measurement error correction values.

In accordance with a second aspect of the present invention, there is provided a calibration system comprising the optical measurement apparatus as set forth above in relation to the first aspect of the invention, the system further comprising: a translatable calibration target disposed opposite a measurement port of the optical measurement apparatus and incrementally translatable relative to the optical measurement apparatus; wherein the confocal measurement subsystem is configured to measure a first distance to the calibration target and the confocal measurement subsystem is configured to measure a second distance to the calibration target; and the processing resource is configured to calculate an error correction value using the first and second measured distances.

The translatable calibration target may be translatable by predetermined distance increments.

The processing resource may be configured to generate a lookup table comprising the error correction value.

According to a third aspect of the present invention, there is provided a method of rapidly measuring a refractive index and a thickness of a region to be measured, the method comprising: longitudinally scanning a confocal measurement subsystem of an optical measurement apparatus to make a first measurement over a measurement cycle; generating a time-varying spectral signal using a Fourier domain interferometric measurement subsystem of the optical measurement apparatus substantially contemporaneously with and using the longitudinal scan; accumulating the time-varying spectral signal during the longitudinal scan to make a second measurement; and calculating a thickness and a refractive index using the first and second measurements.

The method may further comprise: selecting between a plurality of different optical path lengths in a reference arm of the Fourier domain interferometric measurement subsystem in response to progress of the longitudinal scan with respect to a predetermined scan range of the confocal measurement subsystem.

The measurement cycle may comprise a single translation over a predetermined scan range of the confocal measurement subsystem.

The method may comprise calculating an inverse Fourier transform of the accumulated time-varying spectral signal, thereby producing a time-domain measurement signal.

The method may further comprise making the first measurement by translating the optical scanner and detecting a first peak signal received by the confocal detector or the spectrometer performing confocal detection and a second peak signal received by the confocal detector or the spectrometer performing confocal detection and calculating a first translation distance of the optical scanner between the detected first peak signal and the detected second peak signal; the method may further comprise analysing the time-domain signal and detecting a third peak signal in the time-domain measurement signal and a fourth peak signal in the time-domain signal and calculating a second translation distance of the optical scanner corresponding to respective occurrences of the detected third peak signal and the detected fourth peak signal.

The method may further comprise: solving a system of equations using the first and second measurements by neglecting a dispersion of electromagnetic radiation or assuming the dispersion of the electromagnetic radiation is substantially constant.

According to a second aspect of the present invention, there is provided

According to a third aspect of the present invention, there is provided

It is thus possible to provide an optical measurement apparatus and a method of measuring a refractive index that can, in a single measurement step, measure specular reflection and/or scattering of light from front and back surfaces of a sample under test in order to enable both refractive index and thickness of the sample to be determined. Furthermore, distance measurements made are free of ambiguities between ranges shorter than and ranges greater than an optical distance of a reference optical reflector element, which can occur in apparatus comprising a single reference arm optical reflector element. Also, the structure of the apparatus is compatible with implementation in a hand-held device as well as being safe for in vivo measurements. Interferometric measurement in the Fourier domain enables a particularly compact apparatus to be employed that is also simpler in design to corresponding time domain interferometric measurement systems.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
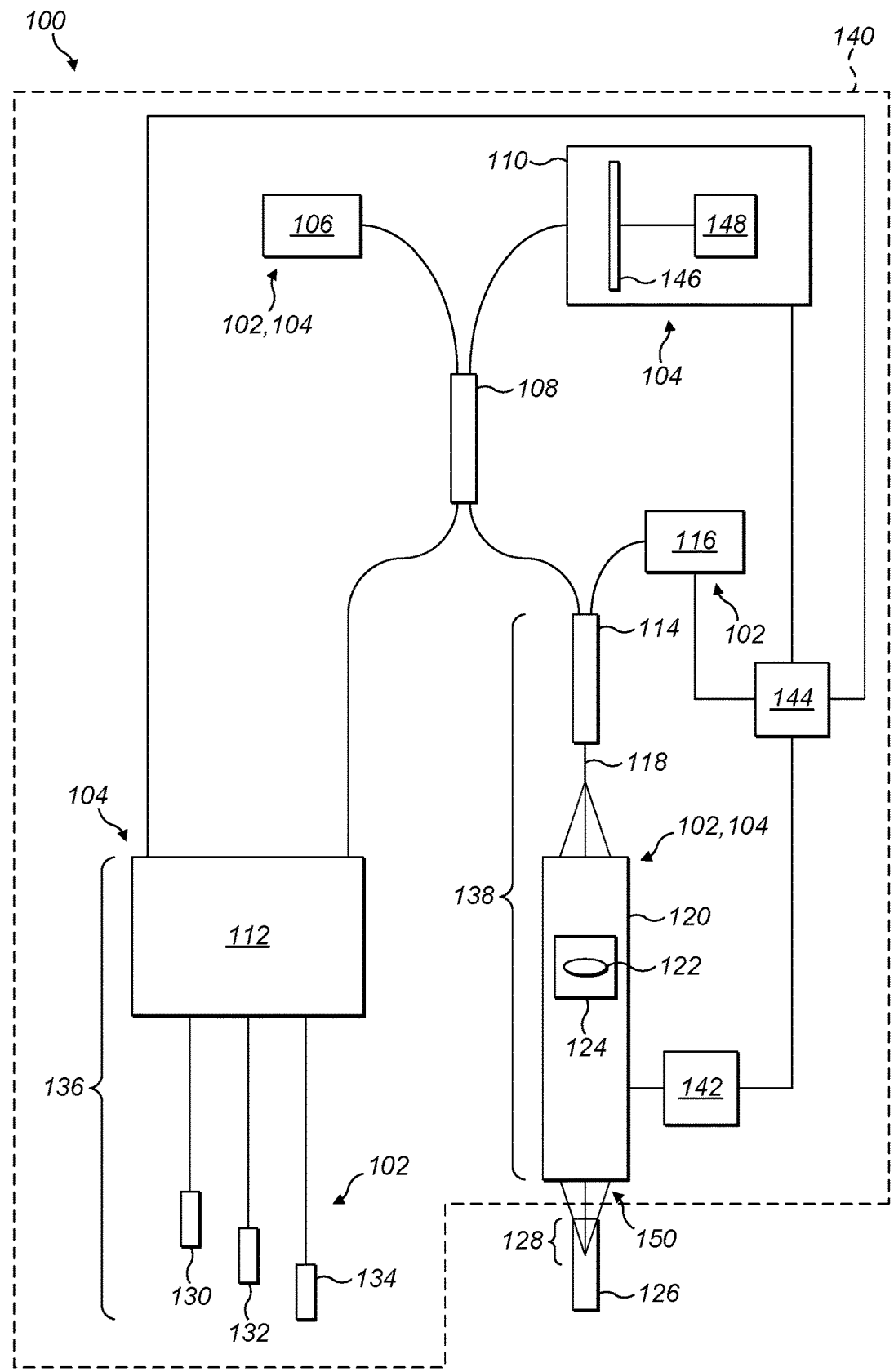
FIG. 1 is schematic diagram of an optical measurement apparatus constituting an embodiment of the invention.

Throughout the following description identical reference numerals will be used to identify like parts.

Referring to FIG. 1, an optical measurement apparatus 100 combines a confocal measurement subsystem 102 with an interferometric measurement subsystem, for example a Fourier domain interferometric measurement subsystem, such as a low-coherence Fourier domain interferometric measurement subsystem 104. The apparatus 100 comprises a source of at least partially coherent electromagnetic radiation, for example a Superluminescent Light Emitting Diode (SLED) 106, operably coupled to a first port of a first optical splitter 108. In this regard, to emit at least partially coherent electromagnetic radiation, the source of electromagnetic radiation has a continuous spectrum and a bandwidth between about 1% and about 10% of a centre wavelength of the electromagnetic radiation emitted. A second port of the first optical splitter 108 is operably coupled to a spectrometer 110, and a third port of the first optical splitter 108 is operably coupled to a first port of an optical switching unit 112 comprising an optical switch (not shown). A fourth port of the first optical splitter 108 is operably coupled to a first port of a second optical splitter 114.

A second port of the second optical splitter 114 is operably coupled to a confocal detector unit 116, and a third port of the second optical splitter 114 is operably coupled to a portion of optical fibre 118, which is disposed opposite a first port of an optical scanning assembly 120 constituting an optical scanner. The confocal detector unit 116 can be any suitable arrangement of optical and optoelectronic devices, for example a fibre-optic implementation, employing a pigtailed photodiode, of the arrangement described in UK patent no. 2 508 368. As the exact implementation of the confocal detector unit 116 is not core to an understanding of the operation of the embodiments described herein, the confocal detector unit 116 will not be described in any further detail. However, the skilled person should appreciate that in other embodiments, the spectrometer 110 can serve as the confocal detection unit 116, thereby replacing the confocal detection unit 116. In such an example, the second optical splitter 114 is not required and the portion of optical fibre 118 is instead coupled to the fourth port of the first optical splitter 108.

In this example, the optical scanning assembly 120 is a confocal scanning optical assembly comprising an optical element, such as a lens 122, mounted on a linearly translatable carriage 124. A second port of the optical scanning assembly 120 constitutes a measurement port 150 for directing electromagnetic radiation to a sample 126 comprising a region 128 to be measured and to receive reflected electromagnetic radiation therefrom.

A second port of the optical switching unit 112 is operably coupled to a first optical reflector element 130, a third port of the optical switching unit 112 is operably coupled to a second optical reflector element 132, and a fourth port of the optical switching unit 112 is operably coupled to a third optical reflector 134. In this example, the first, second and third optical reflector elements 130, 132, 134 constitute a plurality of optical reflector elements that respectively support different optical path lengths for the low-coherence interferometric measurement subsystem 104. Each of the first, second and third optical reflector elements 130, 132, 134 can be any suitable optical element capable of reflecting light incident thereupon, for example a mirror or a retroreflector. Furthermore, the skilled person should appreciate that although the optical switching unit 112 and the first, second and third reference optical reflector elements 130, 132, 134 are described in this example, a single reference optical reflector element can be employed in other examples in place of the optical switching unit 112 and the first, second and third optical reflector elements 130, 132, 134. Likewise, if required, a greater number of optical reflector elements than three can be employed, which can be operably coupled to the optical switching unit 112. In this example, the optical switching unit 112 and the first, second and third optical reflector elements 130, 132, 134 constitute a reference arm 136 of the low-coherence interferometric measurement subsystem 104.

The second optical splitter 114 and the optical scanning assembly 120 constitute a measurement arm 138 of the low-coherence interferometric measurement subsystem 104, but also serves as a common propagation path for the confocal measurement subsystem 102. In this regard, it should be appreciated that the low-coherence interferometric measurement subsystem 104 shares the measurement arm 138 with the confocal measurement subsystem 102.

Furthermore, the internal optical path is internal to a housing 140 described later herein and extends from the second port of the optical scanning assembly 118 towards the region to be measured 120 of the sample. In this example, the length of the internal optical path is fixed. The sample 126, for example biological tissue, which can be in vivo or in vitro, is disposed opposite the second port of the scanning optical assembly 120, but external to the housing 140. In this example, the scanning optical assembly 120 comprises the lens 122 and can linearly translate the lens 122 so as to move closer to and farther away from the region to be measured 128. A processing resource supporting, for example a translation controller 142, such as a microcontroller, is operably coupled to the scanning optical assembly 120, the translatable carriage 124 of the scanning optical assembly 120 carrying an encoder scale (not shown) and a linear encoder (not shown) is disposed opposite the encoder scale and operably coupled to the translation controller 142. The combination of the linear encoder and the encoder scale is, for example, of the type described in UK patent no. GB 2 467 340, and serves to provide position feedback, when in use, with respect to the translatable carriage 124. The processing resource also supports a measurement unit 144 operably coupled to the translation controller 142 as well as the confocal detector unit 116 of the confocal measurement subsystem 102 and the spectrometer 110 of the low-coherence interferometric measurement subsystem 104.

The spectrometer 110 comprises a detector array 146, for example a linear array of detection elements, such as photodiodes, the detector array 146 being operably coupled to an accumulator 148. The detector array 146 constitutes a spectral signal generator.

As will be apparent to the person skilled in the art, the confocal detector unit 116 and the scanning optical assembly 120 constitute the confocal measurement subsystem 102. Similarly, the spectrometer 110, the measurement arm 138, and the optical switching unit 112 and the first, second and third optical reflector elements 130, 132, 134 of the reference arm 136 constitute the low-coherence interferometric measurement subsystem 104. Furthermore, the confocal measurement subsystem 102 and the low-coherence interferometric measurement subsystem 104 share the source of electromagnetic radiation 106, which emits a wavelength of electromagnetic radiation that is therefore common to both subsystems 102, 104.

The above optical measurement apparatus 100 comprises the housing 140 within which the confocal measurement subsystem 102 and the low-coherence interferometric measurement subsystem 104 are disposed along with, in this example, the SLED 106, the first and second optical splitters 108, 114, and the translation controller 142 and the measurement unit 144.

In the above examples, optical fibre is employed to interconnect the various optical elements and functional optical blocks, for example the scanning optical assembly 120, described. However, the skilled person should appreciate that free-space implementations are also contemplated and in such an example "operably coupled" embraces optical coupling through free space.

Figure 2:
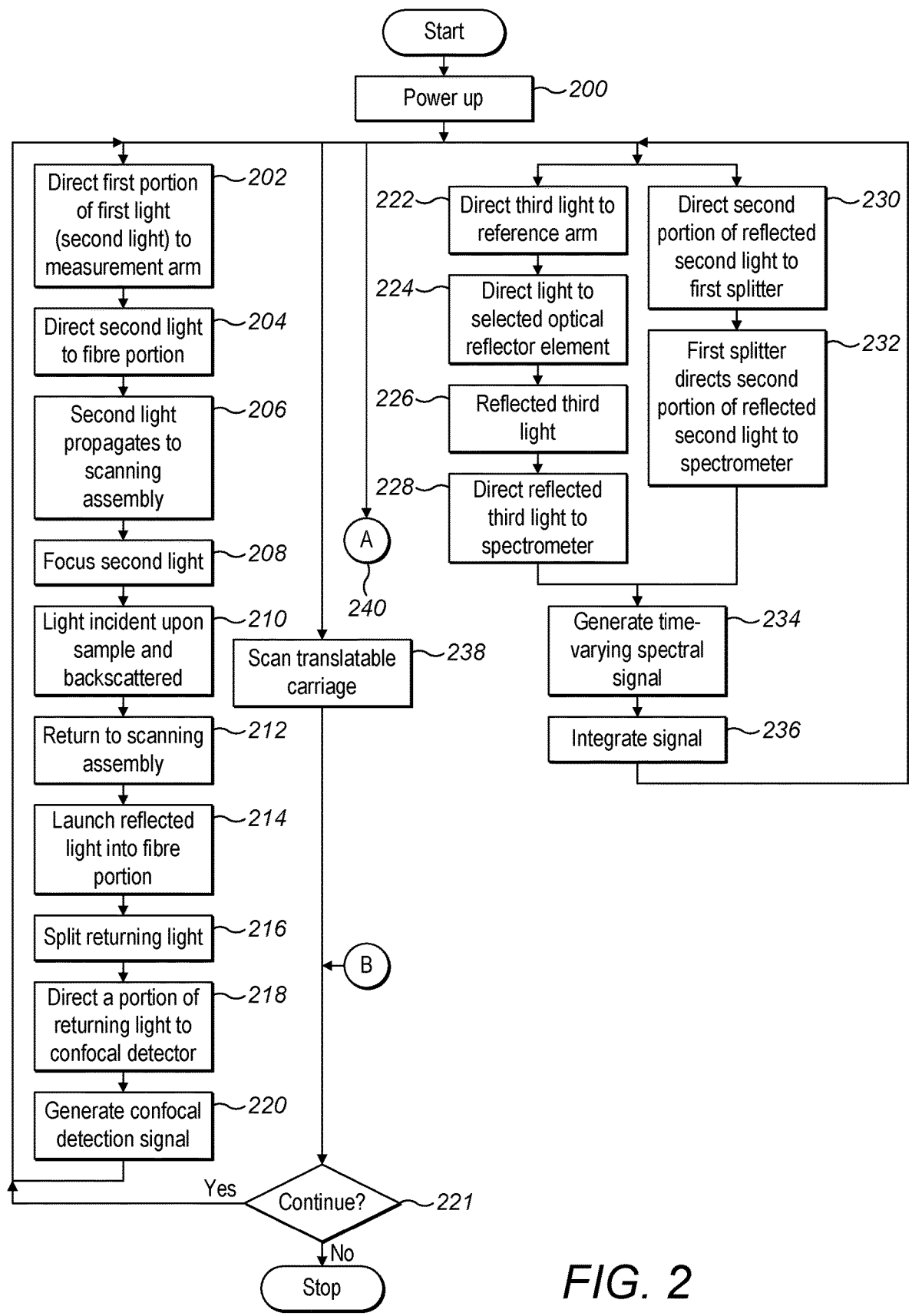
FIG. 2 is a flow diagram of a method of generating signals to measure a refractive index and a thickness using the apparatus of FIG. 1.

In operation (FIG. 2), the SLED 106 is powered up (Step 200) and first electromagnetic radiation, for example at least partially coherent electromagnetic radiation (hereafter referred to as "first light") is emitted by the SLED 106.

Referring to the confocal measurement subsystem 102, the first light propagates to the first optical splitter 108 and a first portion of the first light, hereafter referred to as "second light", is directed (Step 202) by the first optical splitter 108 into the measurement arm 130 and therefore to the second optical splitter 114. The second light entering the second optical splitter 114 is directed to the portion of optical fibre 118 (Step 204), the second light then exiting the portion of optical fibre 118 and entering (Step 206) the optical scanning assembly 120. The second light entering the optical scanning assembly 120 is focused (Step 208) by the lens 122 therein onto a point within or on the sample 126 in the region to be measured 128.

The focused second light incident upon on the sample 126 is specularly reflected (Step 210), and/or in some examples scattered, and some of the reflected (and/or scattered) second light returns (Step 212) to the optical scanning assembly 120, whereupon the reflected second light propagates through the optical scanning assembly 120 before being focused (Step 214) onto the portion of optical fibre 118, i.e. launched into the portion of optical fibre 118. The returning second light is then split (Step 216) by the second optical splitter 114 and a first portion of the second light is directed (Step 218) to the confocal detection unit 116. Consequently, a proportion of the returning light propagating through the measurement arm 138 is directed or tapped off prior to the returning light being mixed with light from the reference arm 136.

The confocal detector unit 116 receiving the first portion of the reflected second light generates (Step 220) a confocal detection signal. The measurement unit 144 then determines (Step 221) whether further measurement sweeps need to be performed or whether measurement is complete. The confocal detection signal is analysed in a manner described later herein.

Turning to the low-coherence interferometric subsystem 104, as mentioned above a first portion of the first light emitted by the SLED 106 (the second light) is directed (Step 202) by the first optical splitter 108 into the measurement arm 138 and therefore to the second optical splitter 114. Additionally, a second portion of the light emitted by the SLED 106, hereafter referred to as "third light", is directed (Step 222) by the first optical splitter 108 into the reference arm 136 and thus towards the optical switching unit 112. Depending upon the setting of the optical switching unit 112, the third light is directed (Step 224) to the first, second or third optical reflector element 130, 132, 134. One of the first, second or third optical reflector element 130, 132, 134 then reflects (Step 226) the third light, which propagates through the optical switching unit 112 back to the first optical splitter 108, whereupon the reflected third light is directed (Step 228) by the first optical splitter 108 to the spectrometer 110.

Similarly, as mentioned above, the first portion of the second light reflected from the sample 126 is directed (Step 218) by the second optical splitter 114 to the confocal detection unit 116. Additionally, the second optical splitter unit 114 directs (Step 230) a second portion of the reflected second light to the first splitter unit 108, whereupon the second portion of the second light is also directed (Step 232) to the spectrometer 110.

The spectrometer generates (Step 234) a time varying spectral signal in response to receipt of the reflected light received from both the reference and measurement arms 136, 138, which varies as the translatable carriage 124 carrying the lens 122 translates during operation, and the time varying spectral signal is accumulated (Step 236) by the accumulator, which can be considered integration of the time varying spectral signal. Thereafter, the integrated spectral signal is processed and analysed in a manner described later herein.

During irradiation of the sample and generation of the confocal detection signal and the integrated spectral signal, the translatable carriage 124 of the scanning optical assembly 120 is controlled by the translation controller 142 to scan (Step 238) the lens 122 towards and away from the region being measured 128 over a predetermined range of travel and at a predetermined frequency. In this regard, it should be appreciated that in this example a measurement cycle comprises a single translation or sweep in one direction of the lens 122 while the lens is oscillating. However, in other embodiments the measurement cycle can comprise more than one translation.

Integration of the time-varying spectral signal has to be in respect of the measurement range of the low-coherence interferometric subsystem 104, which is dictated by the optical path length of the reference arm 136 and is therefore dictated by the distance between the reference reflector element employed and the optical switching unit 112. In this example, the translation range of the translatable carriage 124 is greater than any single measurement range associated with any single respective reference reflector element of the plurality of reflector elements. However, the collective span of the respective measurement ranges associated with the plurality of reflector elements and the ability to switch between reflector elements enables the low-coherence interferometric system 104 to measure over the entire translation range of the translatable carriage 124. As it is intended to integrate the spectral signal generated by the spectrometer 110 over a complete scan range of the translatable carriage 124, it is thus necessary to enable the low-coherence interferometric measurement system 104 to measure over the same range. However, in order to implement the full measurement range of the low-coherence interferometric measurement system 104, it is necessary to switch between the reference reflector elements of the plurality of reference reflector elements.

Figure 3:
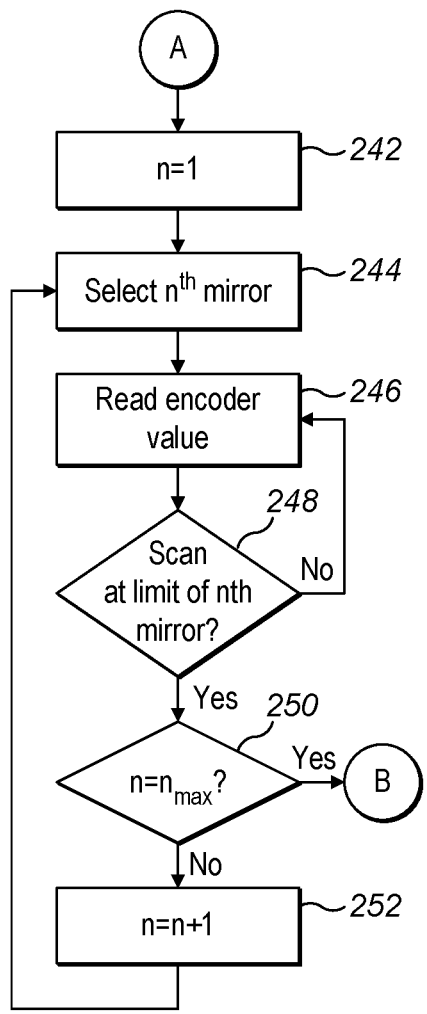
FIG. 3 is a flow diagram of switching of optical reflector elements using the apparatus of FIG. 1.

As such, a switching and monitoring procedure (Step 240) is performed by the measurement unit 144 while the translatable carriage 124 is translating. Turning to FIG. 3, at the beginning of a measurement cycle, in this example, the measurement unit 144 initializes (Step 242) a counter of the number of the optical reflector element to be employed at an initial sub-range of position of the translatable carriage 124, for example n=1, indicating the first optical reflector element 130. The measurement unit 144 then communicates, for example using a control signal, the number of the optical reflector unit of the plurality of optical reflector units to select and the optical selection unit 112 selects (Step 244) the $n^{th}$ optical reflector element in response to the communication received from the measurement unit 144. The measurement unit 144 also accesses (Step 246) the position output of the translatable carriage 124 provided by the translation controller 142 and determines whether the scan range associated with use of the $n^{th}$ optical reflector element corresponds to the current position of the translatable carriage 124. In the event that the selected optical reflector element is within the scan sub-range of the translatable carriage 124 (Step 248), then the measurement unit 144 continues to monitor the position output of the translation controller 142. However, if the position of the translatable carriage 124 has reached the limit (Step 248) of the measurement range of the low-coherence interferometric measurement subsystem 104 using the selected optical reflector element, the measurement unit 144 determines (Step 250) whether all of the optical reflector elements of the plurality of optical reflector elements have been used. In this respect, it should be understood that the optical reflector elements of the plurality of optical reflector elements are arranged in order so as to contiguously span the translation range of the translatable carriage 124. If the number of the currently selected optical reflector element is not the maximum, $n_{max}$, of available optical reflector elements, the measurement unit 144 increments (Step 252) the counter, n, by unity and the above process is repeated (Steps 242 to 252) until the all the optical reflector elements of the plurality of optical reflector elements have been used, whereupon the end of the translation range of the translatable carriage 124 should have been reached by the translatable carriage 124 and the measurement unit 144 determines (Step 221) as mentioned above whether further measurements sweeps need to be performed over subsequent measurement cycles. The switching between the optical reflector elements thus enables a spectral signal to be integrated over each sub-range of the scanning range of the translatable carriage 124 collectively corresponding to the entire scan range of the translatable carriage 124 through use of each of the optical reflector elements 130, 132, 134. The switching between the optical reflector elements also resolves an ambiguity in distinguishing between whether the sample 126 has a calculated range shorter than or greater than the optical distance of a given optical reflector element 130, 132, 136.

It should be appreciated that both the confocal measurement subsystem 102 and the low-coherence interferometric measurement system 104 image longitudinally and substantially contemporaneously, as such the low-coherence interferometric measurement subsystem 104 is operationally dependent upon the confocal measurement subsystem 102. In this regard, the lens 122 constitutes a longitudinal imaging component. During translation of the translatable carriage 124, the translation controller 142 receives position information in respect of the translatable carriage from the position encoder (not shown).

Figure 4:
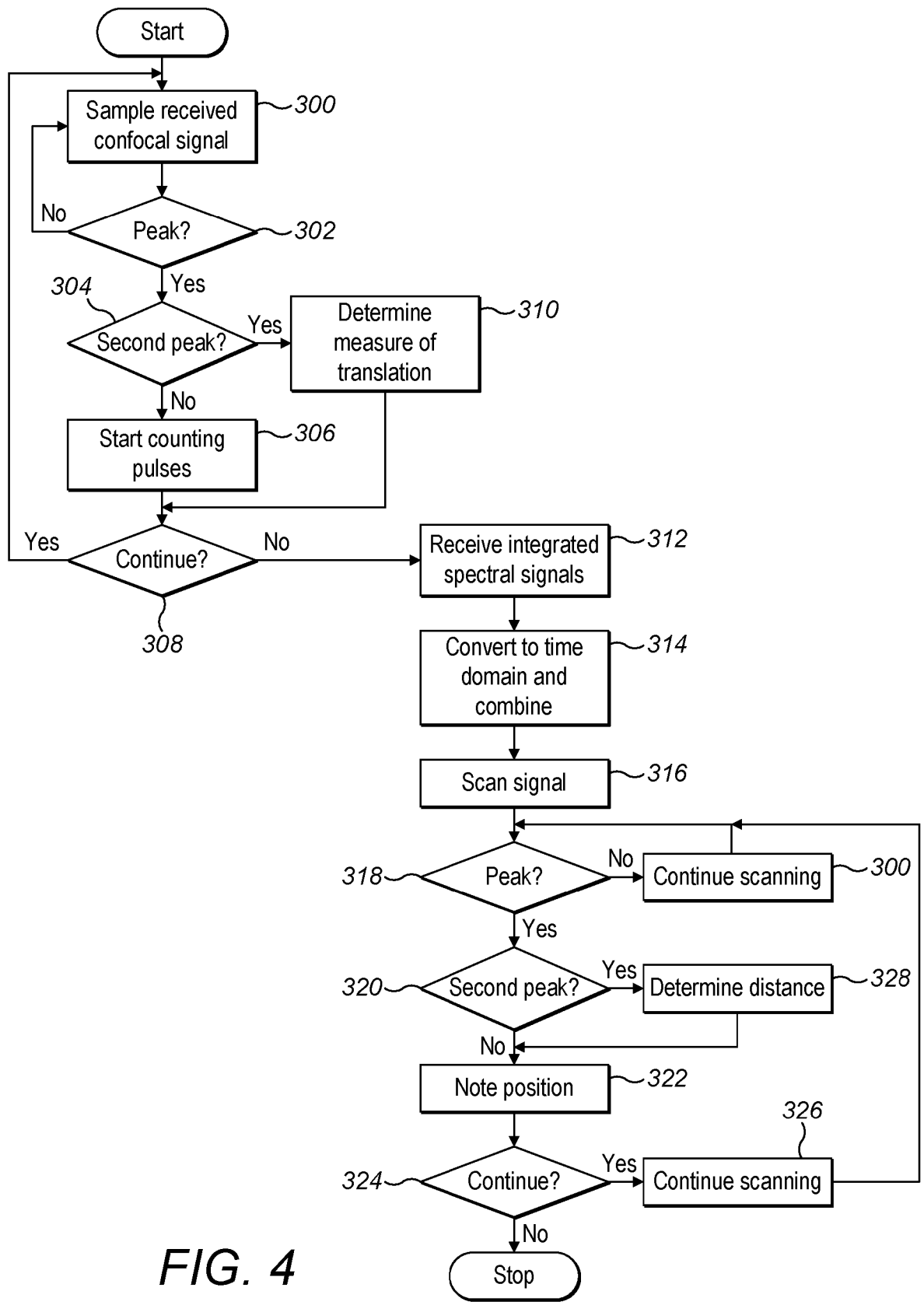
FIG. 4 is a flow diagram of a method of calculating distances between peaks of confocal and spectral signals generated using the apparatus of FIG. 1

Turning to FIG. 4, as described above, while the low-coherence interferometric measurement subsystem 104 generates the integrated spectral signals, the translatable carriage 124 translates for the performance of a confocal measurement in respect of the sample 126. Therefore, in addition to the integrated spectral signal, the measurement unit 144 receives a confocal signal from the confocal detector unit 116 and cooperates with the translation controller 134 to receive the position feedback signal obtained by the translation controller 142 from the position encoder. The measurement unit 144 uses the position feedback signal in order to sample the confocal signal.

Referring to FIG. 4, the integrated spectral signals, and the confocal detection signal in combination with the position feedback signal, can be used to measure simultaneously the refractive index and the thickness of the sample 126 being scanned. In this regard, during translation of the translatable carriage 124 and following low-pass filtering, the measurement unit 144 samples (Step 300) the confocal signal using the position feedback signal obtained from the translation controller 142. The measurement unit 144 searches (Step 302) for peaks in the time-varying confocal signal as the translatable carriage 124, and hence the lens 122 translates, the measure being in terms of pulses of the position feedback signal. When a peak is detected (Step 302), the measurement unit 144 determines (Step 304) whether this is the first of a pair of peaks being detected. In the event that the peak is the first peak being detected, the measurement unit 144 maintains (Step 306) a count of the pulses being received from the position encoder via the translation controller 134 as the translatable carriage 124 translates. The measurement unit 144 then determines (Step 308) if another peak needs to be detected. In the event that it is still necessary to identify the second peak, the measurement unit 144 continues to sample (Step 300) the received confocal signal and awaits detection (Step 302) of the second peak. Upon detection of the second peak (Step 304), the measurement unit 144 calculates (Step 310) the number of pulses that have been received between peaks of the confocal signal constituting a confocal measurement, A.

Thereafter, the measurement unit 144 reads (Step 312) the integrated spectral signals from the spectrometer 110 for further processing in order to detect both thickness and refractive index of the sample 126. Following reading of the integrated spectral signals in respect of each of the optical scanning elements 130, 132, 134, the measurement unit 144 performs a Fourier transform (Step 314) on each of the integrated spectral signals in order to convert the integrated spectral signals to time domain interferometric signals, which are then "stitched" together. The measurement unit 144 then scans the combined time domain interferometric signal (Step 316) to detect (Step 318) peaks of envelopes therein and measures the distances between the peaks of the envelopes. The measurement unit 144 continues scanning (Step 318) until a peak is detected. In this regard, when a peak is detected (Step 318), the measurement unit 144 determines (Step 320) whether this is the first of a pair of peaks being detected. In the event that the peak is the first peak being detected, the measurement unit 144 maintains (Step 322) a record of the position of the peak. The measurement unit 144 then determines (Step 324) if measurement between peaks is still required. In the event that it is still necessary to determine the distance between peaks detected, the measurement unit 144 continues to scan (Step 326) the combined time domain interferometric signal and awaits detection (Step 302) of a second peak. Upon detection of the second peak (Step 320), the measurement unit 144 calculates (Step 328) the distance between peaks of envelopes of the combined time domain interferometric signal constituting an interferometric measurement, B.

The measurement unit 144 continues to measure translation of the translatable carriage 122 between detected peaks in samples of the confocal signal (Steps 300 to 310) and the distance between peaks in time domain interferometric signals (Steps 312 to 326) until such functionality is no longer required, for example when the apparatus 100 is powered down.

As noted above, low-coherence interferometric systems and confocal measurement systems employ different measures of refractive index, namely group refractive index and phase refractive index. In this regard, a confocal measurement of thickness does not give thickness, t, directly but rather $t/n_p$, where $n_p$ is the phase refractive index. Similarly, an interferometric measurement of thickness does not give the thickness, t, directly but rather $n_g t$, where $n_g$ is the group refractive index.

These are defined algebraically as:

$$n_p = \frac{c}{v_p}, \text{ and} \quad (1)$$

$$n_g = \frac{c}{v_g} \quad (2)$$

where $v_g$ and $v_p$ are the group and phase velocities of the light, respectively. These different refractive indices can be related by the following equation:

$$v_g = \left(1 + \frac{\lambda}{n_p}\frac{\partial n_p}{\partial \lambda}\right)v_p \quad (3)$$

where $\partial n_p/\partial \lambda$ represents the dispersion of the medium through which the light propagates.

Substituting the expressions for $n_p$ and $n_g$ of equations (1) and (2) into equation (3) gives the following expression relating group refractive index to the phase refractive index:

$$n_g = n_p - \lambda \frac{\partial n_p}{\partial \lambda} \quad (4)$$

Given the confocal measurement, A, and the low-coherence interferometric measurement, B, and $A = t/n_p$ and $B = n_g t$, equation (4) can be used to relate the measurements A and B to phase refractive index, $n_g$, and wavelength, A:

$$\frac{B}{A} = n_g n_p = n_p\left(n_p - \lambda\frac{\partial n_p}{\partial \lambda}\right) \quad (5)$$

Rearranging equation (5), yields:

$$n_p = \left[\frac{B}{A} + \frac{\lambda^2}{4}\left(\frac{\partial n_p}{\partial \lambda}\right)^2\right]^{1/2} + \frac{\lambda}{2}\frac{\partial n_p}{\partial \lambda} \quad (6)$$

Having derived an expression for the phase refractive index, it follows that the thickness is given by the following expression:

$$t = \left(\frac{n_p AB}{n_p - \lambda\frac{\partial n_p}{\partial \lambda}}\right) \quad (7)$$

The solution of equations (6) and (7) depends upon knowledge of the dispersion. In general, this is not known, but it has been recognised that there are, for example, two situations in which certain assumptions can be made. The first is if the dispersion is very small, in which case it can be neglected. The second is if the dispersion is constant or almost constant when the refractive index changes. This is the case when the material under test is a dilute solution, in which case the refractive index changes with concentration of the solute but the dispersion remains close to that of the solvent.

This second assumption applies, for example, in relation to parts of an eye, for example an aqueous humour and a cornea. In relation to the cornea, the refractive index and thickness of the cornea are known to change in response to blood glucose concentration: the refractive index owing to the change in glucose concentration within the cornea and the thickness owing to osmosis in response to this change in glucose concentration. In such circumstances, the dispersion can be assumed to be equal or similar to that of water, and remains constant with changes in glucose concentration. This approach enables these physical changes in the cornea to be measured directly and thereby avoid inconsistency in measurements where, for example, one of refractive index or thickness can vary between separate measurements using a single technique.

In respect of this measurement cycle, during which the lens is translated once over a predetermined translation distance, the measurement unit 136 therefore performs the confocal measurement and the low-coherence interferometric measurement. The measurement unit 136 then uses a priori knowledge of the wavelength of light employed, the dispersion being that of water and the measurements A and B from the interferometric signal and the confocal signal, in order to evaluate equation (6) to calculate the phase refractive index, $n_p$, and equation (7) to calculate the thickness of the sample. Such computational activity constitutes the solution of a system of equations using the first and second measurements A, B and using an assumed value of the dispersion or a value linking the two kinds of refractive index. The above process is then repeated for as many measurement cycles as required by a measurement methodology, for example if averages of the phase refractive index, $n_p$, and the thickness, t, are being calculated. However, in relation to a given measurement cycle, it should be further measurement is not required to measure both thickness and refractive index parameters.

In any of the above examples, the optical measurement apparatus 100 can be calibrated to compensate for differences between measured distances to the sample 216. In this regard, it has been recognised that a first measurement of a distance to the sample 216 by the low-coherence interferometric measurement subsystem 104 differs from a second substantially contemporaneous measurement of the same distance to the sample 216 by the confocal measurement subsystem 102. The difference between the first and second measurements is attributable to the low-coherence interferometric measurement system 104 being linear, whereas the confocal measurement subsystem 102 possesses non-linearities. In order to be able to correct for such non-linearities in the confocal measurement subsystem 102, a dataset is compiled, in this example, to apply an error correction value to a distance measured by the confocal measurement system 102.

The dataset is compiled by providing a single-surface target opposite the measurement port 150 of the optical measurement apparatus 100 and that is translated by predetermined increments over a range of positions corresponding to the scan range of the optical measurement apparatus 100. At each incremental position, the confocal and low-coherence interferometric measurement subsystems 102, 104 measure a distance to the single-surface target. As the low-coherence interferometric measurement subsystem 104 is linear, the measurement made by the low-coherence interferometric measurement subsystem 104 is treated as a "ground truth" measurement and the difference between the pair of distances measured by the confocal measurement subsystem 102 and the low-coherence measurement subsystem 104 is calculated and constitutes the error correction value. The error correction value is stored in a lookup table with the distance measured by the confocal measurement subsystem 102.

The granularity of the dataset stored in the lookup table is initially dictated by the size of the predetermined increments of the position of the single-surface target. However, where greater resolution is required, interpolation between neighbouring values recorded in the lookup table can be calculated and stored in the lookup table. To achieve such calibration in this example, the linear encoder is configured to provide absolute distance measurements, for example through use of a reference mark therewith. As a common translatable carriage 124 is employed this technique benefits from a degree of error cancellation with respect to the measurements made by the confocal measurement subsystem 102 and the low coherence interferometric measurement subsystem 104.

Thereafter, during post-calibration normal operation of the optical measurement apparatus 100, a measurement made by the confocal measurement subsystem 102 can be looked up in the lookup table and corresponding error correction values extracted and applied by the processing resource to the measurement made.

Although in the above example a lookup table is employed, a curve fitting technique can be employed by the processing resource to fit, for example, an analytical function to the error correction values calculated. One suitable technique is a polynomial best fit technique. The fitted curve can then be referenced by the processing resource to determine an error correction value for a corresponding confocal distance measurement.

With respect to the example of an eye, it should be appreciated that the surfaces within the eye are curved and act as a lens with respect to the light emitted by confocal measurement subsystem 102. The anterior surface of the cornea provides most of the focusing power of the eye. The focusing power of the anterior surface of the cornea causes confocal signal reflected from subsequent surfaces in the eye to be displaced relative to circumstances were the anterior surface of the cornea flat. As the anterior surface of the cornea is convex, the measured apparent thickness is exaggerated, i.e. increased. This change in apparent thickness is a function of both the surface power and the distance of a given subsequent surface from the anterior surface of the cornea. If the curvature of the anterior surface of the is known, for example by measurement, the power of the anterior surface of the cornea can be calculated, and a correction factor applied to remove the effect of the surface power of the anterior surface of the cornea.

The skilled person should appreciate that the above-described implementations are merely examples of the various implementations that are conceivable within the scope of the appended claims. Indeed, in the above examples It should also be appreciated that where the source of at least partially coherent electromagnetic radiation is the SLED 106, the confocal measurement subsystem 102 can employ achromatic optics in order to ensure that no change in focal length with wavelength occurs and so the confocal point spread function is not broadened. Although, in the above examples, a position or distance count is employed to provide the positional state of the translatable carriage 124 used to determine which of the plurality of optical reflector elements 130, 132, 134 in the reference arm 136 of the low-coherence interferometric measurement subsystem 104 is a position, it should be appreciated that other techniques can be employed. For example, if the speed of translation of the translatable carriage 124 is known, time can be used as a measure of the positional state of the translatable carriage 124, such as a duration of translation of the translatable carriage 124.

In the above examples, the low-coherence interferometric measurement subsystem 104 employs a single reference arm 136 comprising the plurality of optical reflector elements 130, 132, 134. However, different configurations for other examples are contemplated, for example the low-coherence interferometric measurement subsystem 104 can comprise a plurality of reference arms, each reference arm comprising one or more optical reflector elements and, where a reference arm comprises more than one optical reflector element, a respective optical switching unit 112.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

The invention claimed is:

1. An optical measurement apparatus combining confocal measurement and low-coherence interferometric measurement, the apparatus comprising: a Fourier domain interferometric measurement subsystem comprising a spectrometer operably coupled to a reference arm, a measurement arm and a source of electromagnetic radiation via an optical coupler, the spectrometer comprising a spectral signal generator responsive, when in use, to received reflected electromagnetic radiation; a confocal measurement subsystem comprising an optical scanner having a predetermined scan range for longitudinally scanning, when in use, a beam along a region to be measured; and a processing resource operably coupled to the Fourier domain interferometric measurement subsystem and the confocal measurement subsystem;

wherein the confocal measurement subsystem shares the measurement arm with the Fourier domain interferometric measurement subsystem, the shared measurement arm comprising the optical scanner of the confocal measurement subsystem; the reference arm comprises a reference optical reflector element; and an accumulator operably coupled to the spectral signal generator-;

a plurality of reference optical reflector elements comprising the reference optical reflector element; and a reflector element selection unit operably coupled to the plurality of reference optical reflector elements; wherein the reflector element selection unit comprises an optical switch, the optical switch being configured to select the reference optical reflector element of the plurality of reference optical reflector elements in response to a control signal.

2. The apparatus according to claim 1, wherein the optical scanner is configured to perform a longitudinal scan;

the spectrometer is configured to generate a time-varying spectral signal during the longitudinal scan; and the accumulator is configured to receive the time-varying spectral signal and to generate an accumulated spectral signal in respect of the longitudinal scan.

3. The apparatus claim 1, wherein the mirror selection unit is operably coupled to the processing resource, the processing resource being configured to generate the control signal in response to a positional state of the optical scanner.

4. The apparatus claim 1, further comprising: a position encoder unit operably coupled to the processing resource and configured to provide position information in respect of the optical scanner.

5. The apparatus according to claim 1, wherein the source of electromagnetic radiation is a source of at least partially coherent electromagnetic radiation.

6. The apparatus to claim 5, wherein the source of at least partially coherent electromagnetic radiation is a common source of electromagnetic radiation operably shared by the confocal measurement subsystem and the Fourier domain interferometric measurement subsystem.

7. The apparatus according to claim 1, wherein the source of electromagnetic radiation is configured to emit a common wavelength of electromagnetic radiation and is shared by the confocal measurement subsystem and the Fourier domain interferometric subsystem.

8. The apparatus according to claim 1, wherein the confocal measurement subsystem comprises a confocal detector.

9. The apparatus according to claim 8, wherein the confocal measurement subsystem and the Fourier domain interferometric measurement subsystem are configured to provide, when in use, to the confocal detector a proportion of first electromagnetic radiation reflected in respect of the measurement arm before combination with second electromagnetic radiation reflected, when in use, in respect of the reference arm.

10. The apparatus according to claim 8, wherein
the processing resource is operably coupled to the confocal detector; and
the processing resource is configured to perform, when in use, a confocal measurement and an interferometric measurement substantially contemporaneously over a measurement cycle.

11. The apparatus according to claim 10, wherein
the processing resource is configured to solve a system of equations using the confocal measurement and the interferometric measurement by neglecting a dispersion of electromagnetic radiation or assuming a constant dependent upon the dispersion of the electromagnetic radiation.

* * * * *